(12) United States Patent
Kimura et al.

(10) Patent No.: US 9,304,818 B2
(45) Date of Patent: Apr. 5, 2016

(54) CONTROL APPARATUS, CONTROL METHOD, COMPUTER PROGRAM PRODUCT, AND SEMICONDUCTOR DEVICE

(71) Applicant: KABUSHIKI KAISHA TOSHIBA, Minato-ku, Tokyo (JP)

(72) Inventors: Tetsuro Kimura, Tokyo (JP); Akihiro Shibata, Tokyo (JP); Tatsunori Kanai, Kanagawa (JP); Haruhiko Toyama, Kanagawa (JP); Koichi Fujisaki, Kanagawa (JP); Junichi Segawa, Kanagawa (JP); Hiroyoshi Haruki, Kanagawa (JP); Masaya Tarui, Kanagawa (JP); Satoshi Shirai, Kanagawa (JP); Yusuke Shirota, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 195 days.

(21) Appl. No.: 13/848,875

(22) Filed: Mar. 22, 2013

(65) Prior Publication Data
US 2013/0254773 A1    Sep. 26, 2013

(30) Foreign Application Priority Data

Mar. 23, 2012 (JP) ................................. 2012-066990
Mar. 15, 2013 (JP) ................................. 2013-053796

(51) Int. Cl.
*G06F 1/26* (2006.01)
*G06F 9/44* (2006.01)
(Continued)

(52) U.S. Cl.
CPC ............ *G06F 9/4893* (2013.01); *G06F 1/3212* (2013.01); *G06F 1/3234* (2013.01); *Y02B 60/1292* (2013.01); *Y02B 60/144* (2013.01)

(58) Field of Classification Search
CPC ... G06F 1/3212; G06F 1/3234; G06F 9/4893; Y02B 60/144; Y02B 60/1292
USPC ........................ 713/300, 340; 718/1, 100, 102
See application file for complete search history.

(56) References Cited

U.S. PATENT DOCUMENTS 8,549,333 B2 * 10/2013 Jackson ......................... 713/300
8,914,652 B1 * 12/2014 Conway ......................... 713/300
(Continued)

FOREIGN PATENT DOCUMENTS

| CN | 101782803 | 7/2010 |
| CN | 102089731 | 6/2011 |
| JP | 2010-259320 | 11/2010 |

OTHER PUBLICATIONS

Office Action for Taiwanese Patent Application No. 102110398 Dated Mar. 16, 2015, 15 pages.
(Continued)

*Primary Examiner* — Mark Connolly
(74) *Attorney, Agent, or Firm* — Amin, Turocy & Watson, LLP

(57) ABSTRACT

According to an embodiment, a control apparatus for controlling a target device includes an estimation unit and an issuing unit. The estimation unit is configured to estimate a second amount of energy required for the entire system including the target device and the control apparatus until the target device completes an execution of its function that is requested in accordance with an execution request for the target device. The issuing unit is configured to issue a control command for causing the target device to execute its function in accordance with the execution request, when the first amount of energy at a time point of receiving the execution request is greater than the second amount of energy.

12 Claims, 13 Drawing Sheets

(51) Int. Cl.
*G06F 9/48* (2006.01)
*G06F 1/32* (2006.01)

(56) References Cited

U.S. PATENT DOCUMENTS

| | | |
|---|---|---|
| 2002/0055961 A1 | 5/2002 | Chauvel et al. |
| 2008/0263375 A1 | 10/2008 | Sundstrom et al. |
| 2010/0174928 A1* | 7/2010 | Borghetti et al. ............. 713/320 |
| 2010/0257529 A1* | 10/2010 | Wilkerson et al. ............ 718/102 |
| 2010/0287559 A1* | 11/2010 | Mergen et al. ................ 718/103 |
| 2010/0299540 A1* | 11/2010 | Brenneman et al. .......... 713/300 |
| 2010/0332043 A1 | 12/2010 | Weyland |
| 2011/0109613 A1 | 5/2011 | Asai et al. |
| 2012/0246356 A1 | 9/2012 | Shibata et al. |
| 2012/0246390 A1 | 9/2012 | Kanai et al. |
| 2012/0246501 A1 | 9/2012 | Haruki et al. |
| 2012/0246503 A1 | 9/2012 | Fujisaki et al. |
| 2013/0067263 A1* | 3/2013 | Liu ................................ 713/340 |
| 2013/0073812 A1 | 3/2013 | Kanai et al. |
| 2013/0080812 A1 | 3/2013 | Shirota et al. |
| 2013/0080813 A1 | 3/2013 | Tarui et al. |
| 2013/0091372 A1 | 4/2013 | Kimura et al. |
| 2013/0191670 A1 | 7/2013 | Haruki et al. |
| 2013/0219203 A1 | 8/2013 | Fujisaki et al. |
| 2013/0254773 A1 | 9/2013 | Kimura et al. |
| 2013/0268781 A1 | 10/2013 | Kanai et al. |

OTHER PUBLICATIONS

Notification of the First Office Action for Chinese Patent Application No. 201310096311.8 dated Apr. 8, 2015, 25 pages.
Notification of the Second Office Action for Chinese Patent Application No. 201310096311.8 dated Dec. 8, 2015, 7 pages.

* cited by examiner

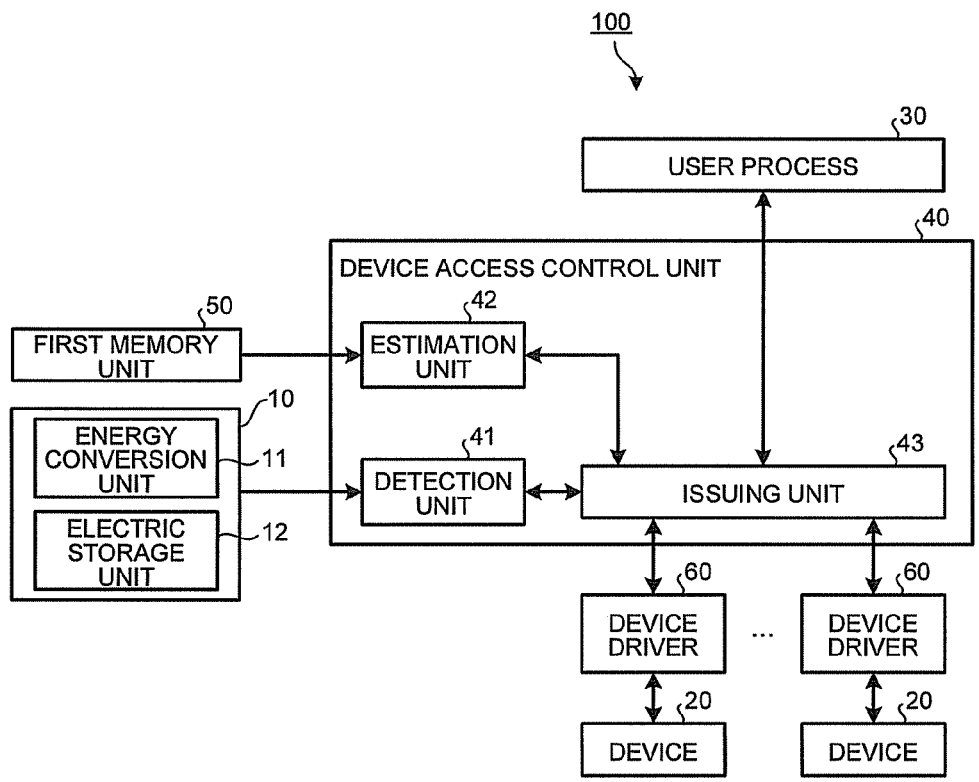

ically illustrating a change in
CONTROL APPARATUS, CONTROL METHOD, COMPUTER PROGRAM PRODUCT, AND SEMICONDUCTOR DEVICE

CROSS-REFERENCE TO RELATED APPLICATIONS

This application is based upon and claims the benefit of priority from Japanese Patent Application No. 2012-066990, filed on Mar. 23, 2012 and Japanese Patent Application No. 2013-053796, filed on Mar. 15, 2013; the entire contents of which are incorporated herein by reference.

FIELD

Embodiments described herein relate generally to a control apparatus, a control method, a computer program product, and a semiconductor device.

BACKGROUND

In the past, there has been known a system that operates by accessorily using power generated by a power generator that converts natural energy into power. There has been known a technique of operating a task processing in such a system only when an amount of energy required for the task processing is able to be covered by an auxiliary power supply unit that stores power generated by a power generator.

However, in the conventional technique, since power required in a system (for example, power consumed in a memory or the like) other than power required for a task processing until completion of the task processing is not considered at all, there is also a fear that power supply will be lost in the middle of the task processing.

BRIEF DESCRIPTION OF THE DRAWINGS

FIG. 1 is a block diagram illustrating an example of a functional configuration of a system according to a first embodiment;

FIG. 2 is a diagram illustrating an example of data stored in a first memory unit according to the first embodiment;

DETAILED DESCRIPTION

Figure 3:
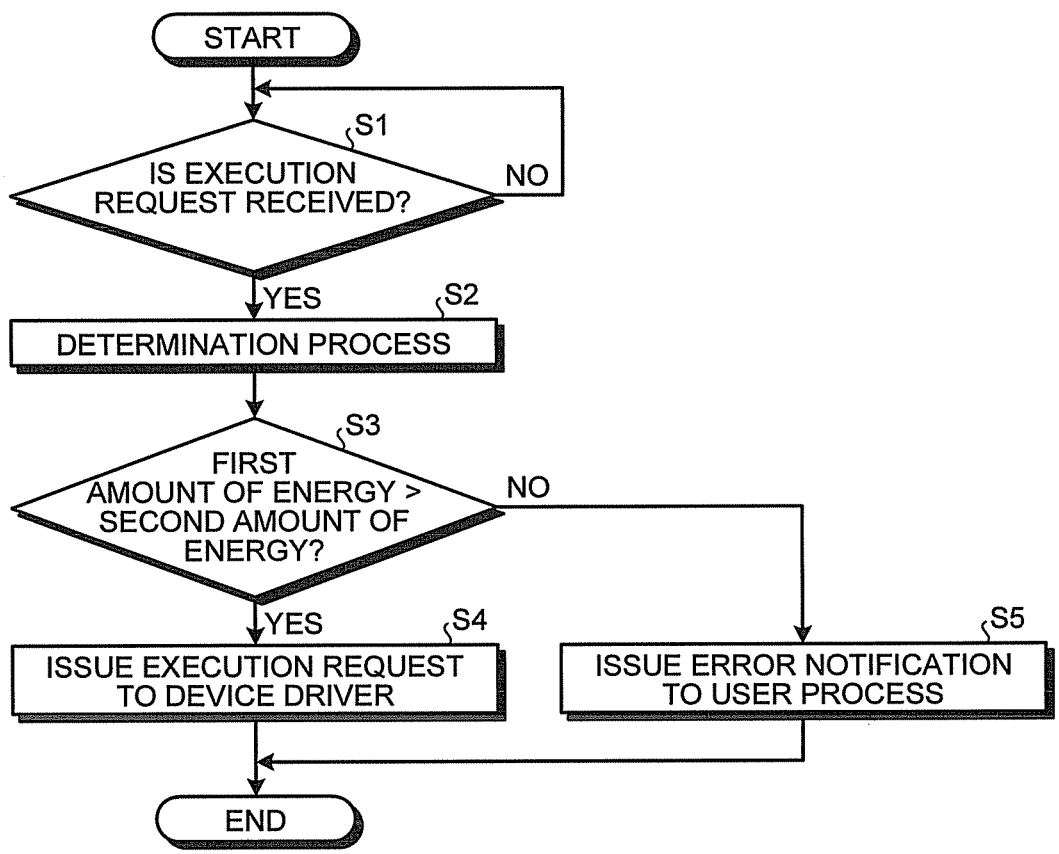
FIG. 3 is a flowchart illustrating an example of an operation of a device access control unit according to the first embodiment.

According to an embodiment, a control apparatus for controlling a target device includes an estimation unit and an issuing unit. The estimation unit is configured to estimate a second amount of energy required for the entire system including the target device and the control apparatus until the target device completes an execution its function that is requested in accordance with an execution request for the target device. The issuing unit is configured to issue a control command for causing the target device to execute its function in accordance with the execution request, when the first amount of energy at a time point of receiving the execution request is greater than the second amount of energy.

Hereinafter, various embodiments will be described in detail with reference to the accompanying drawings.

First Embodiment

FIG. 1 is a block diagram illustrating an example of a functional configuration of a system 100 according to a first embodiment. As illustrated in FIG. 1, the system 100 includes a power supply unit 10, a plurality of target devices 20, a user process 30, a device access control unit 40, a first memory unit 50, and a plurality of device drivers 60 corresponding one to one to the plurality of devices 20. In addition, the system may be configured such that one device driver 60 corresponds to a plurality of devices.

The power supply unit 10 is a supply source of power supplied to the system 100. The power supply unit 10 includes an energy conversion unit 11 and an electric storage unit 12. The energy conversion unit 11 converts energy other than electricity, which is received from outside the power supply unit 10, into electric energy (power). The energy conversion unit 11 includes, for example, a solar cell (solar panel), a radio generating electricity by receiving an electromagnetic wave, or the like; however, the embodiment is not limited thereto. Also, the electric storage unit 12 stores electric energy (power) that is converted into by the energy conversion unit 11. The electric storage unit 12 may include, for example, a battery, a capacitor, or the like. In the first embodiment, the electric storage unit 12 is configured by a capacitor.

The device 20 is a device supplied with power from the power supply unit 10. The device 20 may include, for example, a NAND type flash memory, a disk drive such as a DVD (Digital Versatile Disk) drive, a USB memory, or the like. The device 20 may be embedded in the system 100, or may be connected (external) to the system 100 like a USB memory or the like.

The user process 30 is an application program that is being executed by a CPU of the system 100. The user process 30 requests the device access control unit 40 to execute various types of processing. For example, the user process 30 transmits an execution request for requesting the device 20 to execute its function to the device access control unit 40.

When receiving an execution request from the user process 30, and when a predetermined condition is satisfied, the device access control unit 40 issues a control command for causing the device to execute its function, to the device driver 60 corresponding to the relevant device. On the other hand, if the predetermined condition is not satisfied, the device access control unit 40 outputs an error notification indicating the impossibility of causing the device to execute its function, to the user process 30 as a response to the execution request. This will be described in detail later.

As illustrated in FIG. 1, the device access control unit 40 includes a detection unit 41, an estimation unit 42, and an issuing unit 43. The detection unit 41 measures a first amount of energy that the power supply unit 10 can supply. In the first embodiment, the detection unit 41 measures the amount of power stored in the electric storage unit 12 as the first amount of energy, but is not limited thereto. For example, the detection unit 41 may measure the first amount of energy taking an average value of the amounts of electric energy (amount of power) converted most recently by the energy conversion unit 11 into consideration.

The estimation unit 42 estimates a second amount of energy that is the amount of energy required in the entire system 100 until the device 20 completes an execution of its function that is requested in accordance with an execution request made with respect to the device 20. More specifically, this is as follows. Herein, the first memory unit 50 stores therein identification information for identifying the function of the device 20, a third amount of energy that is the amount of energy required for the execution of the function of the device 20, and an execution time length for which the device 20 executes the function, in an associated manner. In an example of FIG. 2, the first memory unit 50 stores therein one or more pieces of correspondence information in which a device name for identifying the device 20, identification information, a third amount of energy and an execution time length are associated with one another. In the example of FIG. 2, as an example, a third amount of energy and an execution time length corresponding to each of a NAND read operation (Read) and a NAND write operation (Write) are illustrated; however, the embodiment is not limited thereto. Meanwhile, in information of NAND read operation and NAND write operation in FIG. 2, the time and the amount of energy required to read/write data corresponding to one page of a NAND device (required for a unit of execution of a function) are stored. Therefore, in order to determine the time and the amount of energy for a function of the NAND device, an actual amount of energy is calculated by calculating the amount of read or write data based on information received as a parameter of an execution request and determining how many pages it corresponds to. For example, if one page is 2K bytes and a data size as a parameter of a device read request is 8K bytes, since data corresponding to four pages is read out, the amount of energy may be estimated as 40 nWs and the read time may be estimated as 120 ns. In the example of FIG. 2, a third amount of energy is defined as the amount of energy required for a unit of execution of a function of the device 20 and an execution time length is defined as the time required for a unit of execution of the device 20; however, the embodiment is not limited thereto. For example, a third amount of energy may be defined as the total amount of energy required for an execution of a function of the device 20 and an execution time length may be defined as the total time from the start to the completion of an execution of a function of the device 20. Hereinafter, for convenience of description, it is assumed that the first memory unit 50 stores therein identification information and a third amount of energy that is the total amount of energy required for an execution of the function of the device 20, and an execution time length for which the device 20 executes the function, in an associated manner.

The estimation unit 42 reads, from the first memory unit 50, a third amount of energy and an execution time length that correspond to identification information for identifying the function of the device that is requested by an execution request, and estimates a second amount of energy by using the read execution time length and the read third amount of energy. More specifically, the estimation unit 42 estimates a second amount of energy from the sum of a fourth amount of energy and the third amount of energy read from the first memory unit 50. Herein, the fourth amount of energy is an amount of energy that is obtained by multiplying a set power, which is set in advance as the power required in the system 100 other than the power required for an execution of the function of the device 20, by the execution time length read from the first memory unit 50. The set power may be set to, for example, a value obtained by adding the power of a CPU, a memory, or the like, or the power consumed in the device 20 in a standby state and also considering a certain degree of margin. In short, the set power may be considered as the power required in the system 100 other than the power required for an execution of a function of the device 20.

Referring back to FIG. 1, the description will be continued. When receiving an execution request from the user process 30, and when the first amount of energy is greater than the second amount of energy, the issuing unit 43 issues a control command for causing the device 20 to execute the function in accordance with the received execution request to the device driver 60 corresponding to the device 20. In the first embodiment, when the first amount of energy is greater than the second amount of energy, the issuing unit 43 issues the received execution request to the device driver 60. That is, the control command in this example is the received execution request itself. However, a type of control command is not limited thereto, but is optional. When receiving the control command, the device driver 60 performs a control for causing the device 20 to execute the function. In the first embodiment, when receiving the execution request from the issuing unit 43, the device driver 60 performs a control for causing the corresponding device 20 to execute the function. On the other hand, when the first amount of energy is smaller than the second amount of energy, the issuing unit 43 issues an error notification to the user process 30 as a response to the received execution request, without issuing a control command for causing the device 20 to execute the function in accordance with the received execution request, to the device driver 60.

Meanwhile, the control command issued by the issuing unit 43 may be any one as long as it causes the device 20 to execute the function. For example, the issuing unit 43 may be configured to have a function of the device driver 60. In this case, the issuing unit 43 issues an electrical signal for causing the device 20 to execute the function, to the device 20 as the control command. In short, the issuing unit 43 may be any one as long as it issues a control command for causing the device to execute the function in accordance with the execution request, when the first amount of energy is greater than the second amount of energy at the time point of receiving the execution request.

Herein, in addition to the above-described power supply unit 10 and the device 20, a hardware configuration of the system 100 according to the first embodiment includes a computer device having a CPU (Central Processing Unit), a ROM, a RAM, and the like. The respective functions of the user process 30, the detection unit 41, the estimation unit 42, the issuing unit 43, and the device driver 60 described above are implemented by developing and executing programs stored in the ROM or the like on the RAM by the CPU. That is, in this example, a computer device (computer device included in the system 100) capable of implementing the respective functions of the detection unit 41, the estimation unit 42, and the issuing unit 43 described above may also be considered as corresponding to the "control apparatus" of the invention. In addition, the invention is not limited thereto, and for example, at least a portion of the functions of the detection unit 41, the estimation unit 42, the issuing unit 43, and the device driver 60 may also be implemented by a separate circuit (hardware). For example, each of the detection unit 41, the estimation unit 42, and the issuing unit 43 may also be configured by a hardware circuit. That is, the device access control unit 40 may also be configured by a hardware circuit. In this case, the device access control unit (device access control unit) 40 configured by a hardware circuit may also be considered as corresponding to the "control apparatus" of the invention.

Figure 4:
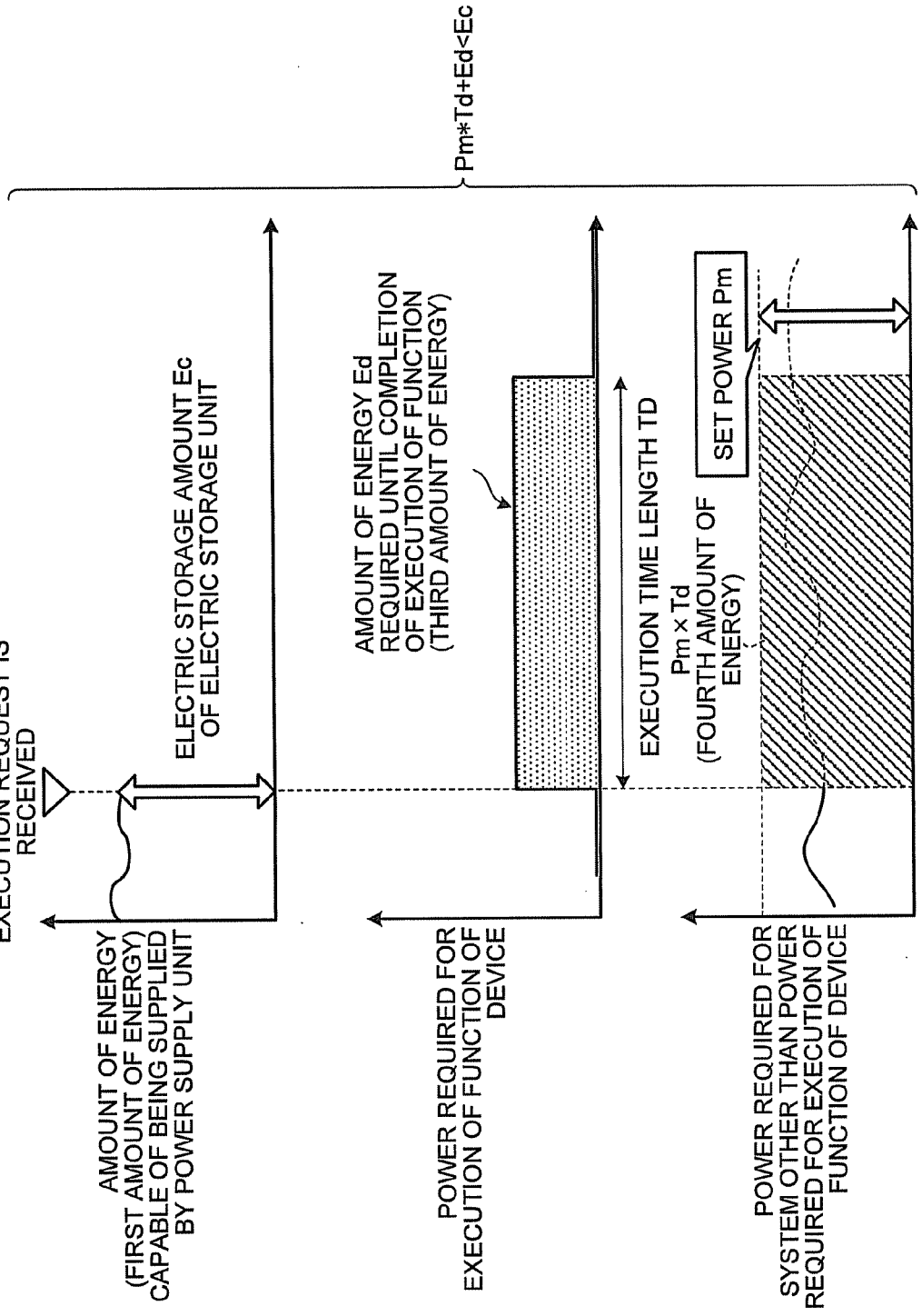
FIG. 4 is a conceptual diagram for describing an example of a determination process according to the first embodiment.

Next, an example of an operation of the device access control unit 40 will be described with reference to FIG. 3. FIG. 3 is a flowchart illustrating an example of an operation of the device access control unit 40. As illustrated in FIG. 3, when receiving an execution request from the user process 30 (Yes in step S1), the device access control unit 40 executes a determination process (step S2). Hereinafter, the determination process will be described in detail with reference to FIG. 4. FIG. 4 is a conceptual diagram for describing the determination process.

When receiving an execution request from the user process 30 (Yes in step S1), the issuing unit 43 requests the detection unit 41 to measure the first amount of energy. When receiving the request, the detection unit 41 measures an electric storage amount Ec of the electric storage unit 12 at this time point as the first amount of energy and notifies the issuing unit 43 of the measured first amount of energy. For convenience of description, the first amount of energy notified to the issuing unit 43 will be denoted by "first amount of energy Ec".

Also, the issuing unit 43 requests the estimation unit 42 to estimate the second amount of energy that is the amount of energy required in the entire system 100 from the start until the completion of an execution of the function of the device 20 in accordance with the received execution request. In this example, the issuing unit 43 makes a request for estimation of the second amount of energy by transferring information specifying a requested function of the device 20 (for example, it may be the execution request itself). When receiving the request, the estimation unit 42 reads a third amount of energy Ed and an execution time length Td corresponding to identification information identifying a function requested by the execution request, from the first memory unit 50. Then, the estimation unit 42 determines a fourth amount of energy (=Pm×Td) by multiplying a predetermined set power Pm by the execution time length Td read from the first memory unit 50, estimates the sum of the determined fourth amount of energy and the third amount of energy Ed as a second amount of energy (=Pm×Td+Ed), and notifies the issuing unit 43 of the estimated second amount of energy. For convenience of description, the second amount of energy notified from the estimation unit 42 to the issuing unit 43 will be denoted by "second amount of energy E2".

The issuing unit 43 compares the first amount of energy Ec notified from the detection unit 41 with the second amount of energy E2 (=Pm×Td+Ed) notified from the estimation unit 42, and determines whether the first amount of energy Ec is greater than the second amount of energy E2. The above is the content of the determination process.

Referring back to FIG. 3, the description will be continued. As a result of the determination process, when it is determined that the first amount of energy Ec is greater than the second amount of energy E2 (Yes in step S3), the issuing unit 43 issues the received execution request to the device driver 60 (step S4). On the other hand, when it is determined that the first amount of energy Ec is smaller than the second amount of energy E2 (No in step S3), the issuing unit 43 issues an error notification to the user process 30 as a response to the received execution request, without issuing the received execution request to the device driver 60 (step S5).

As described above, in the first embodiment, when receiving an execution request from the user process 30, the issuing unit 43 compares the first amount of energy Ec at the time point of receiving the execution request with the second amount of energy E2 required in the entire system 100 until the target device 20 completes an execution of its function that is requested in accordance with the execution request made with respect to the device 20. When the first amount of energy Ec is greater than the second amount of energy E2, the issuing unit 43 issues a control command (in this embodiment, the execution request itself) for causing the device to execute the function. On the other hand, when the first amount of energy Ec is smaller than the second amount of energy E2, the issuing unit 43 does not issue a control command for causing the device to execute the function. Accordingly, the loss of power supply in the middle of execution of the function of the device can be certainly prevented.

As a result of the above-described determination process, when it is determined that the first amount of energy Ec is equal to the second amount of energy E2, the issuing unit 43 may issue the received execution request to the device driver 60 or may issue an error notification to the user process 30. The type of configuration to be used may vary optionally according to design conditions.

Second Embodiment

A second embodiment is different from the first embodiment in that it estimates, at a first time point after the start of an execution of a function of the device 20, a fifth amount of energy that is the amount of energy required in the entire system 100 from the first time point until the completion of the execution of a requested function of the device 20, compares a first amount of energy at the first time point with the fifth amount of energy, and performs a control according to the comparison result. Hereinafter, a description thereof will be given in detail. In addition, an overlap with the first embodiment will be denoted by the same reference symbol, and a description thereof will not be made properly.

Figure 5:
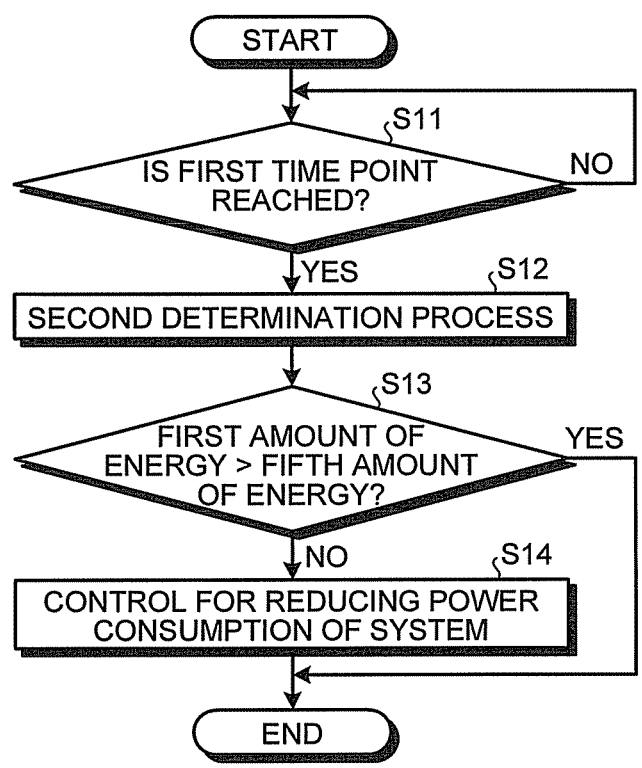
FIG. 5 is a flowchart illustrating an example of an operation of a device access control unit according to a second embodiment.

An example of an operation of the device access control unit 40 will be described with reference to FIG. 5. FIG. 5 is a flowchart for describing an example of an operation of the device access control unit 40 after the start of an execution of a functon of the device 20.

As illustrated in FIG. 5, when it is determined that a first time point is reached (Yes in step S11), the device access control unit 40 executes a second determination process. A method of setting the first time point is optional. For example, the time point when a time measured by a timer reaches a predetermined time may be set as the first time point, the time when an electric storage amount of the electric storage unit 12 is smaller than a predetermined threshold value may be set as the first time point, or the point of time when a control is transferred to an OS by the notification of various requests from the user process 30 to the device access control unit 40, may be set as the first time point. The device access control unit 40 has a function of detecting whether the first time point is reached. In this example, the issuing unit 43 has a function of detecting whether the first time point is reached; however, the embodiment is not limited thereto.

Figure 6:
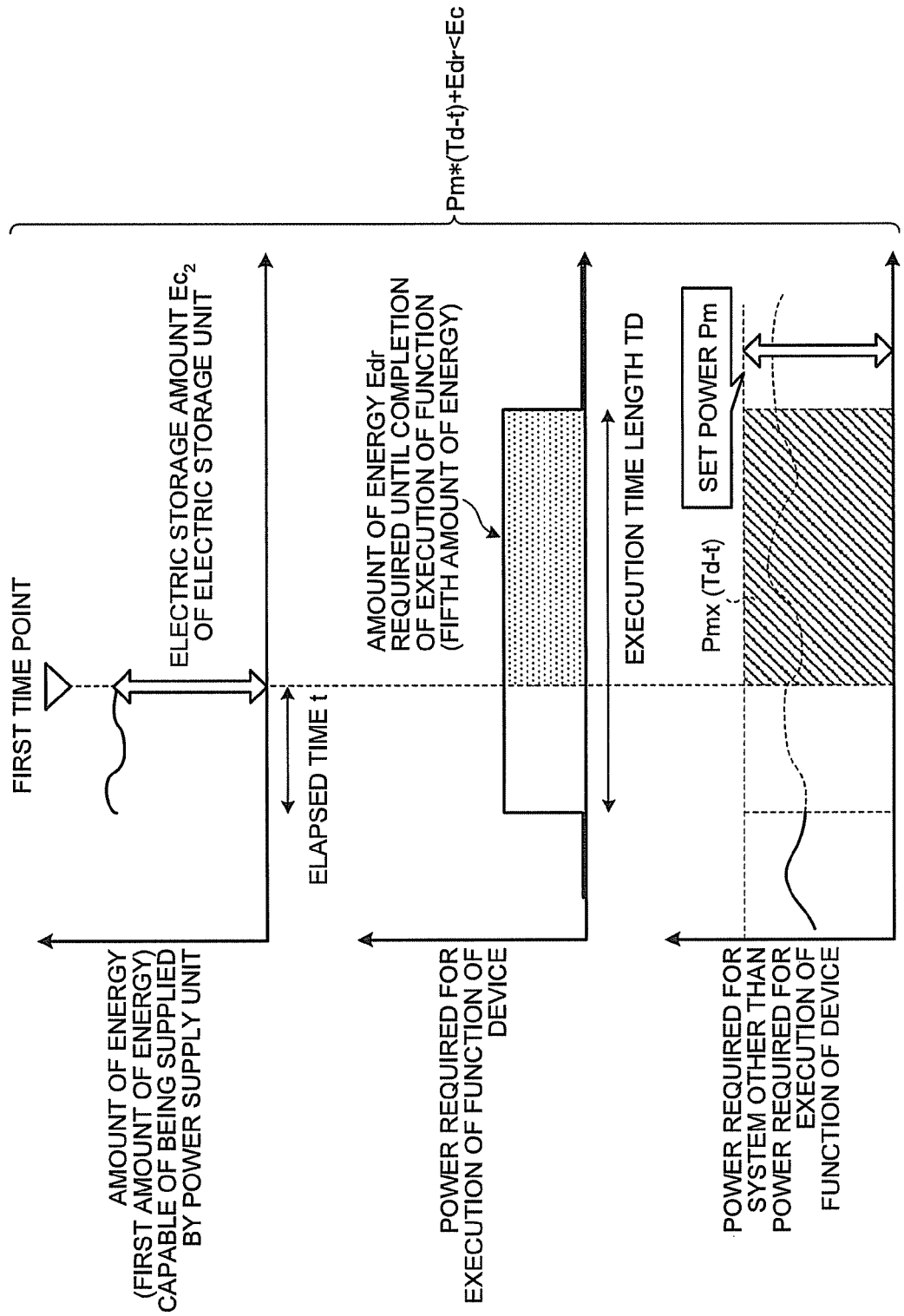
FIG. 6 is a conceptual diagram for describing an example of a second determination process according to the second embodiment.

Next, the second determination process will be described in detail with reference to FIG. 6. FIG. 6 is a conceptual diagram for describing the second determination process. When it is determined that the first time point is reached (Yes in step S11), the issuing unit 43 requests the detection unit 41 to measure the first amount of energy. When receiving the request, the detection unit 41 measures an electric storage amount Ec2 of the electric storage unit 12 at this time point as the first amount of energy and notifies the issuing unit 43 of the measured first amount of energy. For convenience of description, the first amount of energy notified to the issuing unit 43 will be denoted by "first amount of energy Ec2".

Furthermore, the issuing unit 43 requests the estimation unit 42 to estimate a fifth amount of energy required in the entire system 100 from the first time point until the completion of an execution of the function of the device 20. In this example, the issuing unit 43 transmits time information indicating an elapsed time t from the time point of receiving an execution request from the user process 30 to the first time point to the estimation unit 42, and requests the estimation unit 42 to estimate the fifth amount of energy. When receiving the request, the estimation unit 42 estimates the fifth amount of energy by using a third amount of energy and an execution time length Td, which correspond to identification information indentifying a function currently executed by the device 20, and the elapsed time t. More specifically, this is as follows.

In the second embodiment, a table illustrating a relation between the remaining time until the completion of an execution of the function of the device 20 and the amount of energy required for the execution of the function of the device 20 is stored for each device 20 in a memory (not illustrated). The estimation unit 42 determines the remaining time Td−t until the completion of an execution of the function of the device 20 by subtracting the elapsed time t from the execution time length Td read from the first memory unit 50, and reads an amount of energy corresponding to the determined remaining time from the table corresponding to the relevant device 20. The read amount of energy is the remaining amount of energy Edr required for an execution of the function of the device 20 from the first time point until the completion of the execution of the function of the device 20. In addition, in the second embodiment, a table illustrating a relation between the remaining time until the completion of an execution of a function of the device 20 and the amount of energy required for the execution of the function of the device 20 is stored in a memory (not illustrated); however, the embodiment is not limited thereto. For example, in another configuration, a calculation equation for determining the remaining amount of energy Edr required for an execution of a function of the device 20 with respect to the remaining time until the completion of the execution of the function of the device 20 may be stored in a memory. In this configuration, the estimation unit 42 may determine the amount of energy Edr corresponding to the remaining time Td−t until the completion of an execution of a function of the device 20, by using the calculation equation read from the memory.

Furthermore, the estimation unit 42 calculates an amount of energy (=Pm×(Td−t)+Edr) required in the system 100 other than the amount of energy required for an execution of a function of the device 20 from the first time point until the completion of the execution of the function of the device 20, by multiplying the remaining time Td−t until the completion of the execution of the function of the device 20 by a predetermined set power Pm. Then, the estimation unit 42 estimates the sum of the calculated amount of energy and the above-described amount of energy Edr as the fifth amount of energy, and notifies the issuing unit 43 of the estimated fifth amount of energy. For convenience of description, the fifth amount of energy notified from the estimation unit 42 to the issuing unit 43 will be denoted by "fifth amount of energy E5".

The issuing unit 43 compares the first amount of energy EC2 notified from the detection unit 41 and the fifth amount of energy E5 (=Pm×(Td−t)+Edr) notified from the estimation unit 42, and determines whether the first amount of energy EC2 is greater than the fifth amount of energy E5. The above is the content of the second determination process.

Referring back to FIG. 5, the description will be continued. As a result of the second determination process, when it is determined that the first amount of energy EC2 is greater than the fifth amount of energy E5 (Yes in step S13), the process is ended. That is, the execution of the function of the device 20 is continued. On the other hand, when it is determined that the first amount of energy EC2 is smaller than the fifth amount of energy E5 (No in step S13), the issuing unit 43 performs a control for reducing the power consumption of the system 100 while causing the device 20 to continuously execute the function (step S14). For example, the issuing unit 43 may perform a control for suppressing the power consumption of the CPU. As an example, the issuing unit 43 may reduce the process speed of the CPU by using DVFS or the like. Alternatively, the issuing unit 43 may cause the CPU to be changed into an idle state (state of executing no process), and may perform a control such that an idle state is continued over a predetermined time period. Still alternatively, the issuing unit 43 may perform a control for stopping the power supply to the device 20 to which the power supply can be stopped (for example, liquid crystal back light and the like), among the device 20 that is not requested to execute its function.

As described above, in the second embodiment, whenever the above-described first time point is reached after the start of an execution of a function of the device 20, the first amount of energy EC2 at the first time point is compared with the fifth amount of energy E5 required in the entire system 100 from the first time point until the completion of the execution of the function of the device 20. When the first amount of energy EC2 is smaller than the fifth amount of energy E5, a control for reducing the power consumption of the system 100 is performed while causing the device 20 to continuously execute the function. Accordingly, for example, in an operation separate from an execution of a function of the device 20, the loss of power supply in the middle of the execution of the function of the device 20 can be maximally prevented even when the amount of energy required in the entire system 100 until the completion of the execution of the function of the device 20 is greater than the value estimated at the time point of receiving the execution request because the calculation amount of the CPU increases suddenly.

Third Embodiment

A third embodiment is different from the above-described embodiments in that, after the start of an execution of a function of the device 20 (hereinafter, referred to as "first device"), when receiving an execution request (hereinafter, referred to as "second execution request") for requesting another device 20 (hereinafter, referred to as "second device 20") different from the first device 20 to execute its function, a sixth amount of energy that is the amount of energy required in the entire system 100 from the time point of receiving the second execution request until the completion of the execution of functions of the first device 20 and the second device 20 is estimated, the sixth amount of energy is compared with a first amount of energy at the time point of receiving the second execution request, and a control according to the comparison result is performed. Hereinafter, a description thereof will be given in detail. In addition, an overlap with the above-described respective embodiments will be denoted by the same reference symbol, and a description thereof will be not provided properly.

Figure 7:
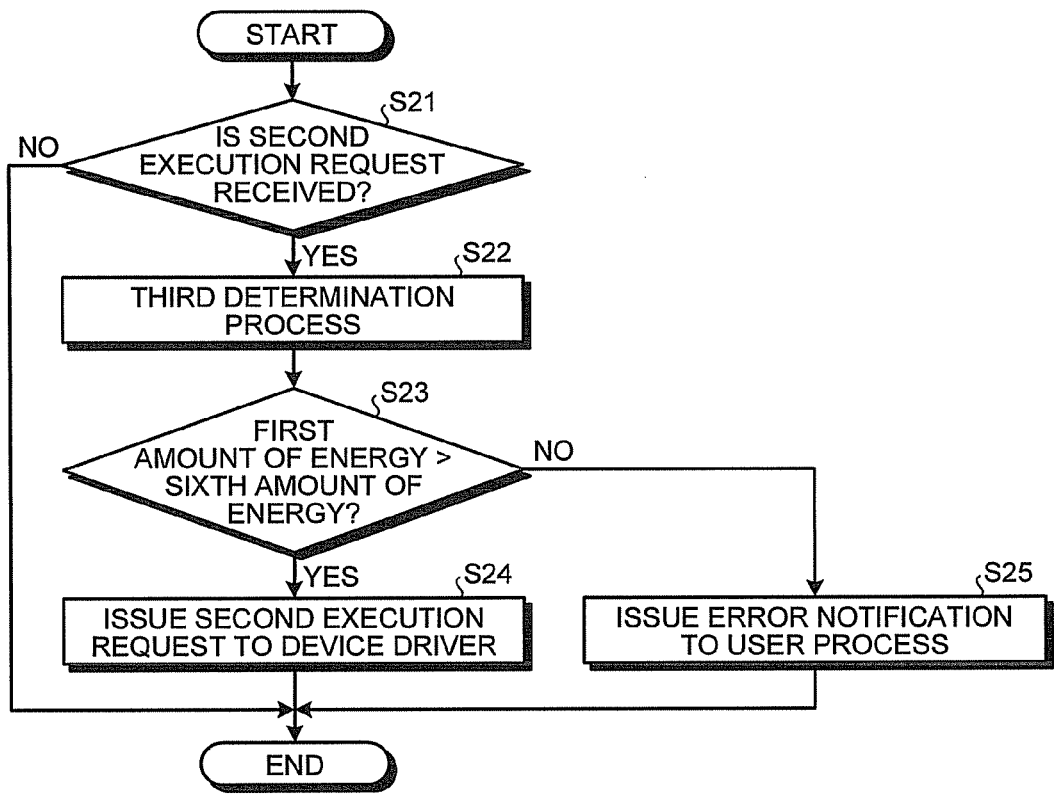
FIG. 7 is a flowchart illustrating an example of an operation of a device access control unit according to a third embodiment.

An example of an operation of the device access control unit 40 according to the third embodiment will be described with reference to FIG. 7. FIG. 7 is a flow chart for describing an example of an operation of the device access control unit 40 after the start of an execution of a function of the first device 20. As illustrated in FIG. 7, when receiving the second execution request from the user process 30 (Yes in step S21), the device access control unit 40 executes a third determination process (step S22). Hereinafter, the content of the third determination process will be described in detail.

When receiving the second execution request from the user process 30 (Yes in step S21), the issuing unit 43 requests the detection unit 41 to measure the first amount of energy. When receiving the request, the detection unit 41 measures an electric storage amount Ec3 of the electric storage unit 12 at this time point as the first amount of energy and notifies the issuing unit 43 of the measured first amount of energy. For convenience of description, the first amount of energy notified to the issuing unit 43 will be denoted by "first amount of energy Ec3".

Furthermore, the issuing unit 43 requests the estimation unit 42 to estimate a sixth amount of energy required in the entire system 100 from the time point of receiving the second execution request until the completion of the execution of the functions of the first device 20 and the second device 20. In this example, the issuing unit 43 transfers information specifying a function requested by the second execution request (for example, it may be the second execution request itself) and time information indicating an elapsed time t2 from the time point of receiving the execution request for requesting the first device 20 to execute the function to the time point of receiving the second execution request, to the estimation unit 42, and requests the estimation unit 42 to estimate the sixth amount of energy. When receiving the request, the estimation unit 42 estimates the sixth amount of energy by using: an execution time length Td and a third amount of energy that correspond to identification information identifying a function requested by the execution request for requesting the first device 20 to execute the function; an elapsed time t2; and a third amount of energy and an execution time length Td that correspond to identification information indentifying a function requested by the second execution request. More specifically, this is as follows. Hereinafter, the third amount of energy corresponding to the identification information identifying a function requested by the execution request will be denoted by Ed1, the execution time length corresponding to the identification information indentifying a function requested by the execution request will be denoted by Td1, the third amount of energy corresponding to the identification information identifying a function requested by the second execution request will be denoted by Ed2, and the execution time length corresponding to the identification information identifying a function requested by the second execution request will be denoted by Td2.

As in the second embodiment, the estimation unit 42 determines the remaining time (Td1−t2) until the completion of an execution of a function of the first device 20, and reads an amount of energy corresponding to the determined remaining time from a table corresponding to the first device 20. More specifically, the estimation unit 42 determines the remaining time (Td1−t2) until the completion of an execution of a function of the first device 20 by reading the execution time length Td1 corresponding to the identification information identifying a function (a function executed by the first device 20) requested by the execution request from the first memory unit 50 and subtracting the elapsed time t2 from the read execution time length Td1. Then, the estimation unit 42 reads an amount of energy corresponding to the determined remaining time from a table corresponding to the first device 20. The read amount of energy is the remaining amount of energy Ed1 r required for an execution of a function of the first device 20 from the time point of receiving the second execution request until the completion of the execution of the function of the first device 20.

Furthermore, as in the first embodiment, the estimation unit 42 reads the third amount of energy Ed2 and the execution time length Td2 corresponding to an execution of a function of the second device 20 from the first memory unit 50.

In addition, in the third embodiment, the estimation unit 42 compares the remaining time (Td1−t2) until the completion of an execution of a function of the first device 20 and the execution time length Td2 that correspond to the identification information identifying a function requested by the second execution request. When the relation of Td1−t2>Td2 is established, the estimation unit 42 determines an amount of energy (=Pm×(Td1−t2)) required in the system 100 other than the amount of energy required for an execution of a function of the device 20, by multiplying the remaining time (Td1−t2) until the completion of the execution of a function of the first device 20 by a predetermined set power Pm. Then, the estimation unit 42 estimates the sum (=Pm×(Td1−t2)+Ed1r+Ed2) of the above-determined amount of energy (=Pm×(Td1−t2)), the remaining amount of energy Ed1 r required for an execution of a function of the first device 20, and the third amount of energy Ed2 corresponding to the identification information identifying a function requested by the second execution request, as the sixth amount of energy.

On the other hand, when the relation of Td1−t2<Td2 is established, the estimation unit 42 determines an amount of energy (=Pm×Td2) required in the system 100 other than the amount of energy required for an execution of a function of the device 20, by multiplying the execution time length Td2 corresponding to the identification information indentifying a function requested by the second execution request by the set power Pm. Then, the estimation unit 42 estimates the sum (=Pm×Td2+Ed1r+Ed2) of the above-determined amount of energy (=Pm×Td2), the remaining amount of energy Ed1 r required for an execution of a function of the first device 20, and the third amount of energy Ed2 corresponding to the identification information identifying a function requested by the second execution request, as the sixth amount of energy.

The estimation unit 42 notifies the issuing unit 43 of the above-estimated sixth amount of energy. For convenience of description, the sixth amount of energy notified from the estimation unit 42 to the issuing unit 43 will be denoted by "sixth amount of energy E6".

The issuing unit 43 compares the first amount of energy Ec3 notified from the detection unit 41 and the sixth amount of energy E6 notified from the estimation unit 42, and determines whether the first amount of energy Ec3 is greater than the sixth amount of energy E6. The above is the content of the third determination process.

Referring back to FIG. 7, the description will be continued. As a result of the third determination process, when it is determined that the first amount of energy Ec3 is greater than the sixth amount of energy E6 (Yes in step S23), the issuing unit 43 issues a control command for causing the second device 20 to execute the function (in this example, the received second execution request itself) to the device driver 60 corresponding to the second device 20 (step S24). On the other hand, when it is determined that the first amount of energy Ec3 is smaller than the sixth amount of energy E6 (No in step S23), the issuing unit 43 issues an error notification to the user process 30 as a response to the second execution request, without issuing a control command for causing the second device 20 to execute the function to the device driver 60 (step S25).

As described above, in the third embodiment, after the start of an execution of a function of the first device 20, when receiving the second execution request for requesting the second device 20 to execute a function, the issuing unit 43 compares the first amount of energy Ec3 at the time point of receiving the second execution request and the sixth amount of energy E6 required in the entire system 100 from the time point receiving the second execution request until the completion of the execution of the functions of the first device 20 and the second device 20. When the first amount of energy Ec3 is greater than the sixth amount of energy E6, the issuing unit 43 issues a second control command for causing the second device 20 to execute the function (in this embodiment, the second execution request itself). On the other hand, when the first amount of energy Ec3 is smaller than the sixth amount of energy E6, the issuing unit 43 does not issue the second control command to the device driver 60 corresponding to the second device 20. Accordingly, the loss of power supply in the middle of the execution of the function of the device 20 can be certainly prevented.

Fourth Embodiment

A fourth embodiment is different from the above-described embodiments in that, when it is determined that the device 20 cannot be caused to execute a function in accordance with an execution request received from the user process 30 (for example, when First Amount of Energy Ec<Second Amount of Energy E2 is established), a device access control unit 400 performs a control for holding the received execution request. Hereinafter, a description thereof will be given in detail. Hereinafter, a difference from the first embodiment will be mainly described, an overlap with the first embodiment will be denoted by the same reference symbol, and a description thereof will be not provided properly.

Figure 8:
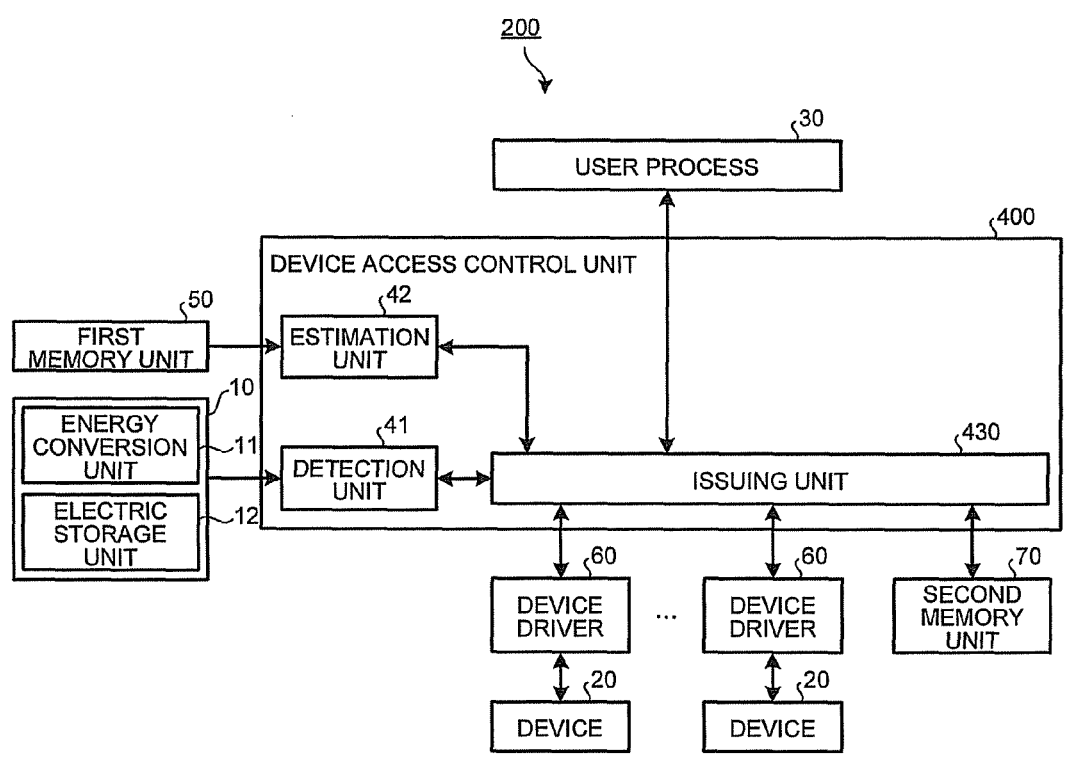
FIG. 8 is a block diagram illustrating an example of a functional configuration of a system according to a fourth embodiment.

FIG. 8 is a block diagram illustrating an example of a functional configuration of a system 200 according to the fourth embodiment. As illustrated in FIG. 8, the system 200 is different from the first embodiment in that it further includes a second memory unit 70 capable of storing an execution request from the user process 30. Also, in addition to the functions described in the first embodiment, an issuing unit 430 of the device access control unit 400 performs a control for writing an execution request received from the user process 30 in the second memory unit 70 in a predetermined case.

Figure 9:
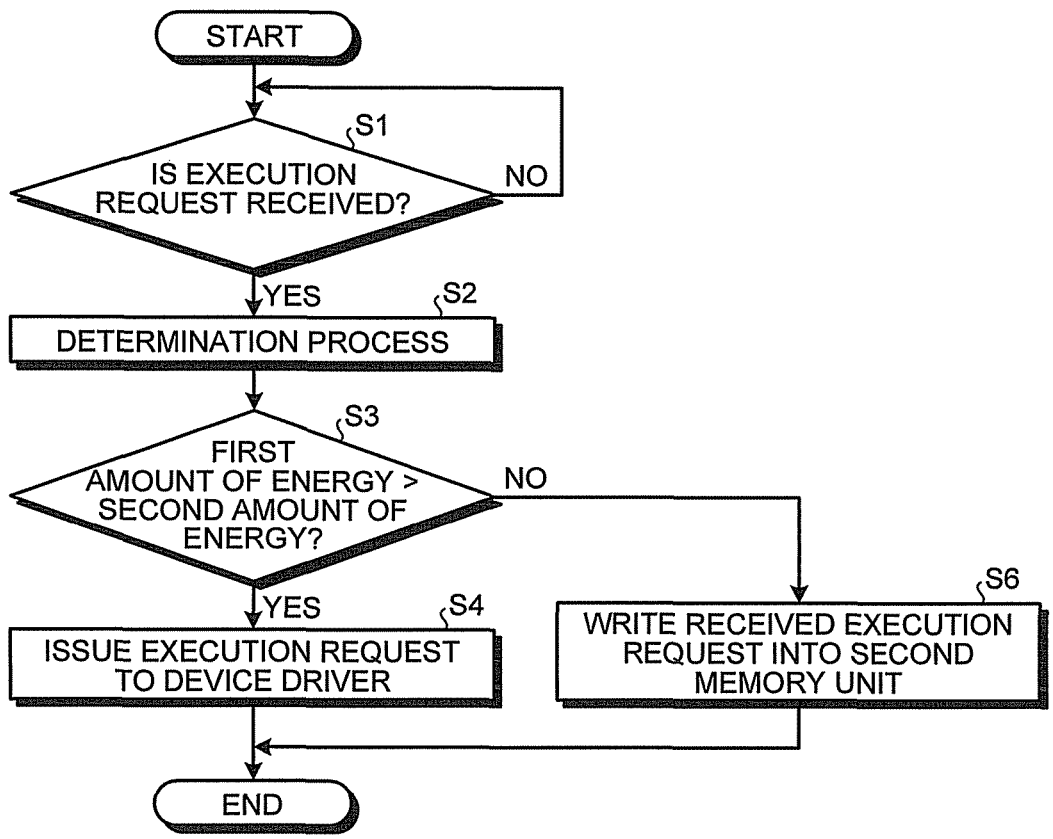
FIG. 9 is a flowchart illustrating an example of an operation of a device access control unit according to the fourth embodiment.

Next, an example of an operation of the device access control unit 400 according to the fourth embodiment will be described with reference to FIG. 9. FIG. 9 is a flow chart illustrating an example of an operation of the device access control unit 400. The contents of steps S1 to S3 and step S5 are the same as those in the example of FIG. 3, and thus a detailed description thereof will be not provided. The fourth embodiment is different from the above-described first embodiment in that, as a result of the above-described determination process, when it is determined that the first amount of energy Ec is smaller than the second amount of energy E2 (No in step S3), the issuing unit 430 performs a control for writing an execution request received from the user process 30 in the second memory unit 70 (step S6).

Figure 10:
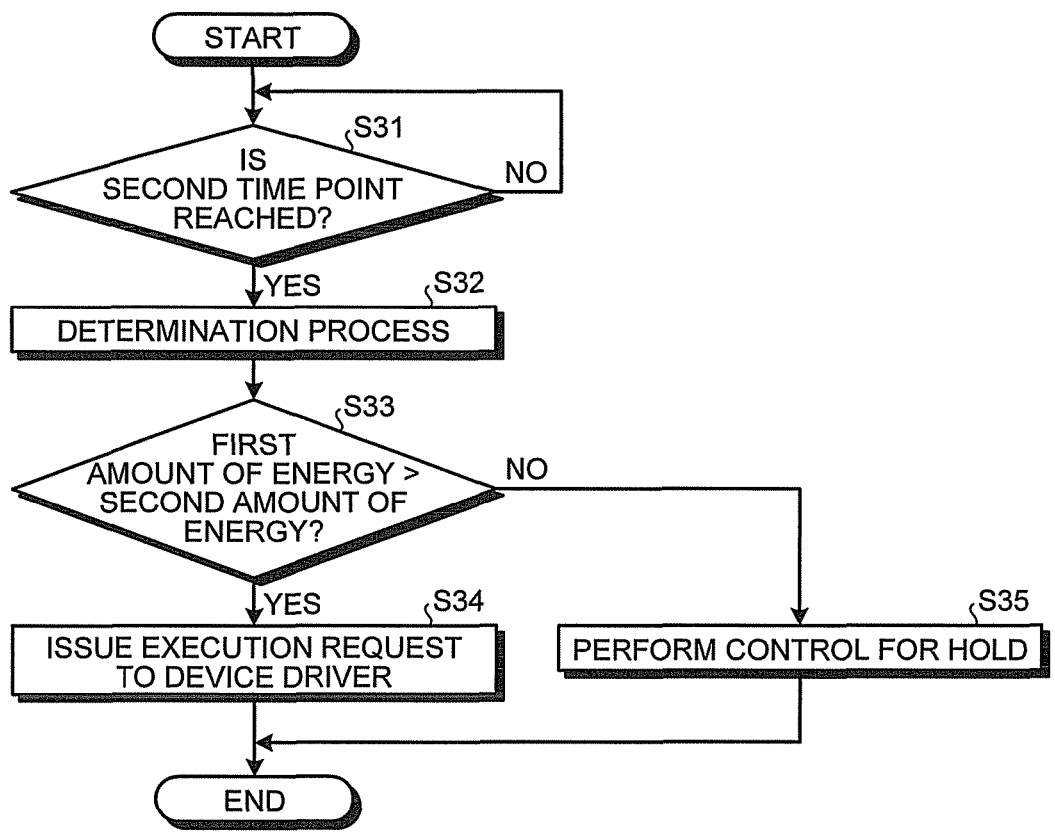
FIG. 10 is a flowchart illustrating an example of an operation of a device access control unit according to the fourth embodiment.

Then, at a second time point after the execution request from the user process 30 is written in the second memory unit 70, the device access control unit 400 estimates the second amount of energy required in the entire system 200 until the completion of an execution of a function of the device 20 in accordance with the execution request written in the second memory unit 70, compares the second amount of energy and a first amount of energy at the second time point, and performs a control according to the comparison result. Hereinafter, a description thereof will be given in detail. FIG. 10 is a flow chart for describing an example of an operation of the device access control unit 400 after the execution request from the user process 30 is written in the second memory unit 70.

As illustrated in FIG. 10, when it is determined that a second time point is reached (Yes in step S31), the device access control unit 400 executes a determination process (step S32). In addition, a method of setting the second time point is optional. For example, the time point when a time measured by a timer reaches a predetermined time may be set as the second time point, the time when an electric storage amount of the electric storage unit 12 is greater than a predetermined threshold value may be set as the second time point, or the time point of receiving an event such as an interrupt may be set as the second time point. The device access control unit 400 has a function of detecting whether the second time point is reached. In this example, the issuing unit 430 has a function of detecting whether the second time point is reached; however, the embodiment is not limited thereto.

The content of a determination process in step S32 is basically identical to the content of the determination process in the first embodiment. When it is determined that the second time point is reached (Yes in step S31), the issuing unit 430 requests the detection unit 41 to measure the first amount of energy. When receiving the request, the detection unit 41 measures an electric storage amount Ec of the electric storage unit 12 at this time point as the first amount of energy and notifies the issuing unit 430 of the measured first amount of energy. For convenience of description, the first amount of energy notified to the issuing unit 430 will be denoted by "first amount of energy Ec".

Furthermore, the issuing unit 430 requests the estimation unit 42 to estimate the second amount of energy that is the amount of energy required in the entire system 200 until the completion of an execution of a requested function of the device 20 in accordance with the execution request. In this example, the issuing unit 430 makes a request for estimation of the second amount of energy by transferring information specifying a function requested by the execution request stored in the second memory unit 70 (for example, it may be the execution request itself). When receiving the request, the estimation unit 42 reads a third amount of energy Ed and an execution time length Td that correspond to identification information identifying a function requested by the execution request stored in the second memory unit 70, from the first memory unit 50. Then, the estimation unit 42 determines a fourth amount of energy (=Pm×Td) by multiplying a predetermined set power Pm by the execution time length Td read from the first memory unit 50, estimates the sum of the determined fourth amount of energy and the third amount of energy Ed as a second amount of energy (=Pm×Td+Ed), and notifies the issuing unit 430 of the estimated second amount of energy. For convenience of description, the second amount of energy notified from the estimation unit 42 to the issuing unit 430 will be denoted by "second amount of energy E2".

The issuing unit 430 compares the first amount of energy Ec notified from the detection unit 41 and the second amount of energy E2 (=Pm×Td+Ed) notified from the estimation unit 42, and determines whether the first amount of energy Ec is greater than the second amount of energy E2. The above is the content of a determination process in step S33.

Referring back to FIG. 10, the description will be continued. As a result of the determination process, when it is determined that the first amount of energy Ec is greater than the second amount of energy E2 (Yes in step S33), the issuing unit 430 issues an execution request stored in the second memory unit 70 to the device driver 60 (step S34), and deletes the execution request from the second memory unit 70. On the other hand, when it is determined that the first amount of energy Ec is smaller than the second amount of energy E2 (No in step S33), the issuing unit 430 performs a control for holding the execution request (step S35). More specifically, without issuing an execution request stored in the second memory unit 70 to the device driver 60, the issuing unit 430 performs a control for retaining the execution request in the second memory unit 70.

As described above, in the fourth embodiment, when receiving an execution request from the user process 30, the issuing unit 430 compares the first amount of energy Ec at the time point of receiving the execution request and the second amount of energy E2 required for the entire system 200 until the completion of an execution of a function of the device 20 requested by the execution request. When the first amount of energy Ec is smaller than the second amount of energy E2, the issuing unit 430 writes the received execution request in the second memory unit 70 without issuing an error notification to the user process 30. Thereafter, at a second time point, the issuing unit 430 compares a first amount of energy Ec at the second time point and a second amount of energy E2 required for the entire system 200 until the completion of an execution of a function of the device 20 requested by the execution request written in the second memory unit 70. When the first amount of energy Ec is greater than the second amount of energy E2, the issuing unit 430 issues the execution request written in the second memory unit 70 to the device driver 60. On the other hand, when the first amount of energy Ec is smaller than the second amount of energy E2, the issuing unit 430 holds the execution request written in the second memory unit 70, without issuing the execution request written in the second memory unit 70 to the device driver 60. That is, the execution request is held until the function requested by the execution request from the user process 30 can be executed. Therefore, the user process 30 may issue the execution request only once. Accordingly, the loss of power supply in the middle of the execution of a function of the device 20 can be certainly prevented.

Modified Example of Fourth Embodiment

At the second time point described above, when another device 20 (for convenience of description, referred to as "first device 20") is executing its function separately from the device 20 (for convenience of description, referred to as "second device 20") that is requested to execute a function in accordance with an execution request written in the second memory unit 70, the device access control unit 400 may estimate the amount of energy required for the entire system 200 from the second time point until the completion of the execution of the functions of the first device 20 and the second device 20, compare the estimated amount of energy and the first amount of energy at the second time point, and perform a control according to the comparison result. In this example, since the second time point may be considered as "the time point of receiving the second execution request" in the third embodiment, the amount of energy required for the entire system from the second time point until the completion of the execution of the functions of the first device 20 and the second device 20 may also be considered as the sixth amount of energy in the third embodiment. Hereinafter, the amount of energy required for the entire system from the second time point until the completion of the execution of the functions of the first device 20 and the second device 20 will be referred to as a "sixth amount of energy ".

Figure 11:
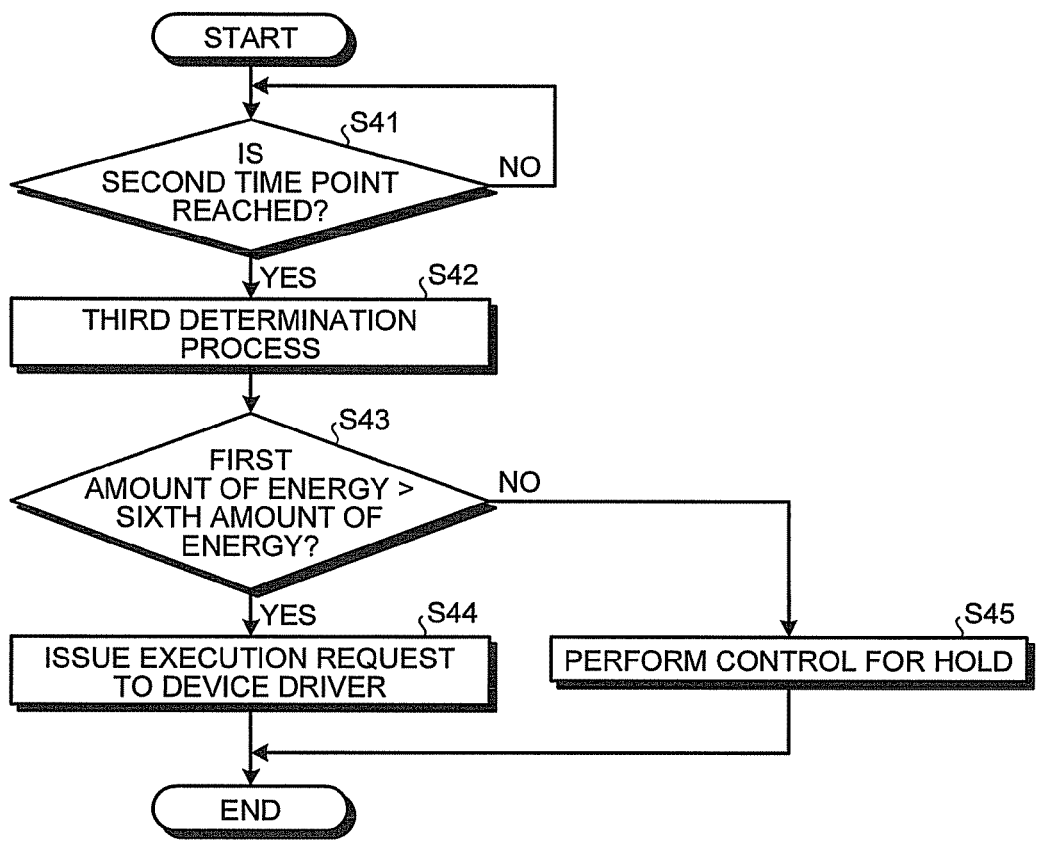
FIG. 11 is a flowchart illustrating an example of an operation of a device access control unit according to a modified example.

FIG. 11 is a flow chart for describing an example of an operation of the device access control unit 400 after the execution request from the user process 30 is written in the second memory unit 70. As illustrated in FIG. 11, when it is determined that the second time point is reached (Yes in step S41), the device access control unit 400 executes a third determination process (step S42). The content of the third determination process in step S42 is basically identical to the content of the third determination process in the third embodiment.

When it is determined that the second time point is reached (Yes in step S41), the issuing unit 430 requests the detection unit 41 to measure the first amount of energy. When receiving the request, the detection unit 41 measures an electric storage amount Ec3 of the electric storage unit 12 at this time point as the first amount of energy and notifies the issuing unit 430 of the measured first amount of energy. For convenience of description, the first amount of energy notified to the issuing unit 430 will be denoted by a "first amount of energy Ec3".

Furthermore, the issuing unit 430 requests the estimation unit 42 to estimate a sixth amount of energy required for the entire system 200 from the time point of reaching the second time point (which may be considered as the time point of receiving the second execution request) until the completion of an execution of the functions of the first device 20 and the second device 20. In this example, the issuing unit 430 transfers information specifying a function requested by the execution request stored in the second memory unit 70 (for example, it may be the execution request itself stored in the second memory unit 70) and time information indicating an elapsed time t2 from the time point of receiving an execution request for requesting the first device 20 to execute the function to the second time point, to the estimation unit 42, and requests the estimation unit 42 to estimate the sixth amount of energy.

When receiving the request from the issuing unit 430, the estimation unit 42 estimates the sixth amount of energy by using: an execution time length Td and a third amount of energy that correspond to identification information indentifying a function executed by the first device 20; an elapsed time t2; and an execution time length Td and a third amount of energy that correspond to identification information identifying a function executed by the second device 20. This content is the same as that in the third embodiment described above, a detailed description thereof will not be repeated. Then, the estimation unit 42 notifies the issuing unit 430 of the estimated sixth amount of energy. For convenience of description, the sixth amount of energy notified from the estimation unit 42 to the issuing unit 430 will be denoted by a "sixth amount of energy E6".

The issuing unit 430 compares the first amount of energy Ec3 notified from the detection unit 41 and the sixth amount of energy E6 notified from the estimation unit 42, and determines whether the first amount of energy Ec3 is greater than the sixth amount of energy E6. The above is the content of the third determination process.

Referring back to FIG. 11, the description will be continued. As a result of the third determination process, when it is determined that the first amount of energy Ec3 is greater than the sixth amount of energy E6 (Yes in step S43), the issuing unit 430 issues an execution request stored in the second memory unit 70 to the device driver 60 (step S44), and deletes the execution request from the second memory unit 70. On the other hand, when it is determined that the first amount of energy Ec3 is smaller than the sixth amount of energy E6 (No in step S43), the issuing unit 430 performs a control for holding the execution request (step S45). More specifically, without issuing an execution request stored in the second memory unit 70 to the device driver 60, the issuing unit 430 performs a control for retaining the execution request in the second memory unit 70.

An example of an application of the embodiments described above will be described below. When electric energy converted from energy other than electricity is used not auxiliary but mainly, there is a fear that power supply will be lost when the power consumption of the system is greater than the electric generation amount. Therefore, it is necessary to stop the system stably before the loss of power supply. In this case, when a memory is a nonvolatile memory, the state of a processing task such as calculation, which is performed solely by a CPU and a memory and does not involve an execution of a function of a device, can be saved in the main memory before the loss of power supply, so that the system can be stopped stably before the loss of power supply. However, for example, when power supply is lost in the middle of writing into a device such as a NAND, there is a risk that a state in the NAND will be destroyed and become irreparable. In this case, the invention according to each of the above-described embodiments is effective.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 12:
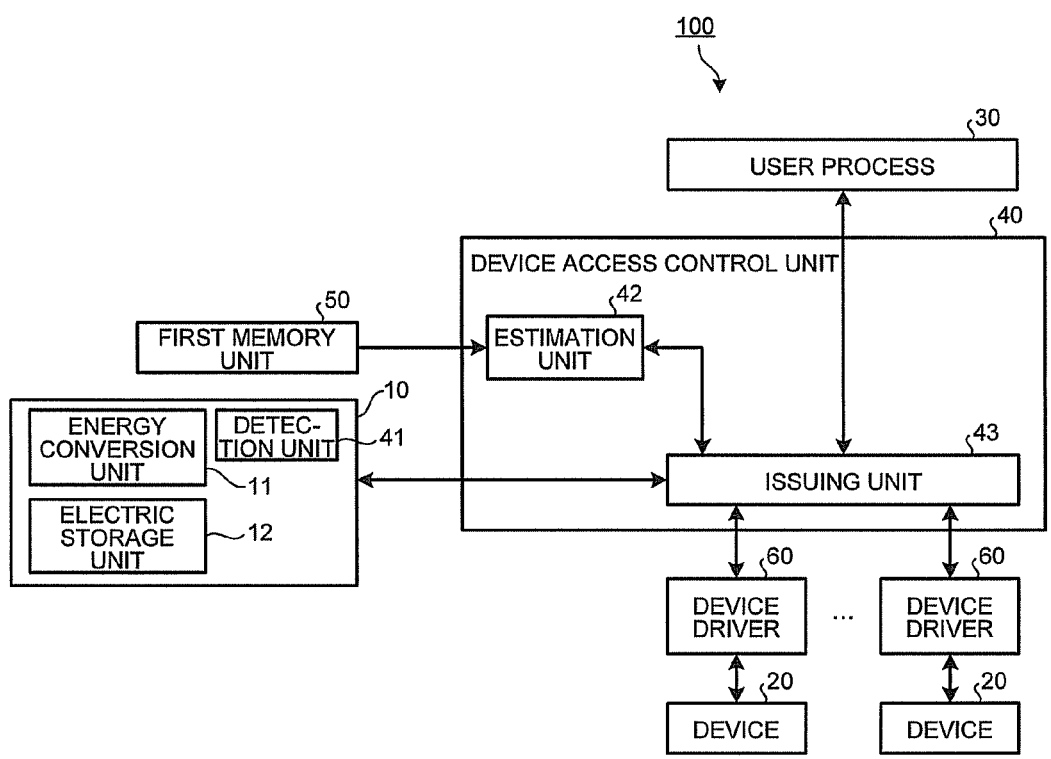
FIG. 12 is a block diagram illustrating an example of a configuration of a system according to a modified example.

In the above-described first embodiment, the device access control unit 40 includes the detection unit 41; however, it is not limited to this and, for example, the device access control unit 40 may not include the detection unit 41. For example, as illustrated in FIG. 12, the detection unit 41 may be included in the power supply unit 10. Moreover, for example, the detection unit 41 may be provided separately (independently) from the power supply unit 10 and the device access control unit 40. In other words, it is sufficient that the control device according to the present invention includes the estimation unit and the output unit.

Moreover, the device access control unit 40 described above may be composed of a semiconductor integrated circuit (IC chip) capable of executing at least each function of the estimation unit 42 and the output unit 43 described above. In other words, the present invention can be applied also to a semiconductor device and it is sufficient that the semiconductor device according to the present invention includes the estimation unit and the output unit.

Moreover, in the first embodiment described above, when the detection unit 41 receives a request from the output unit 43, the detection unit 41 detects the first power amount (the electric storage amount Ec of the electric storage unit 12); however, it is not limited to this and, for example, the detection unit 41 may detect the first power amount constantly or at predetermined intervals. In this case, when the detection unit 41 receives a request from the output unit 43, the detection unit 41 notifies the output unit 43 of the latest detection result.

Figure 13:
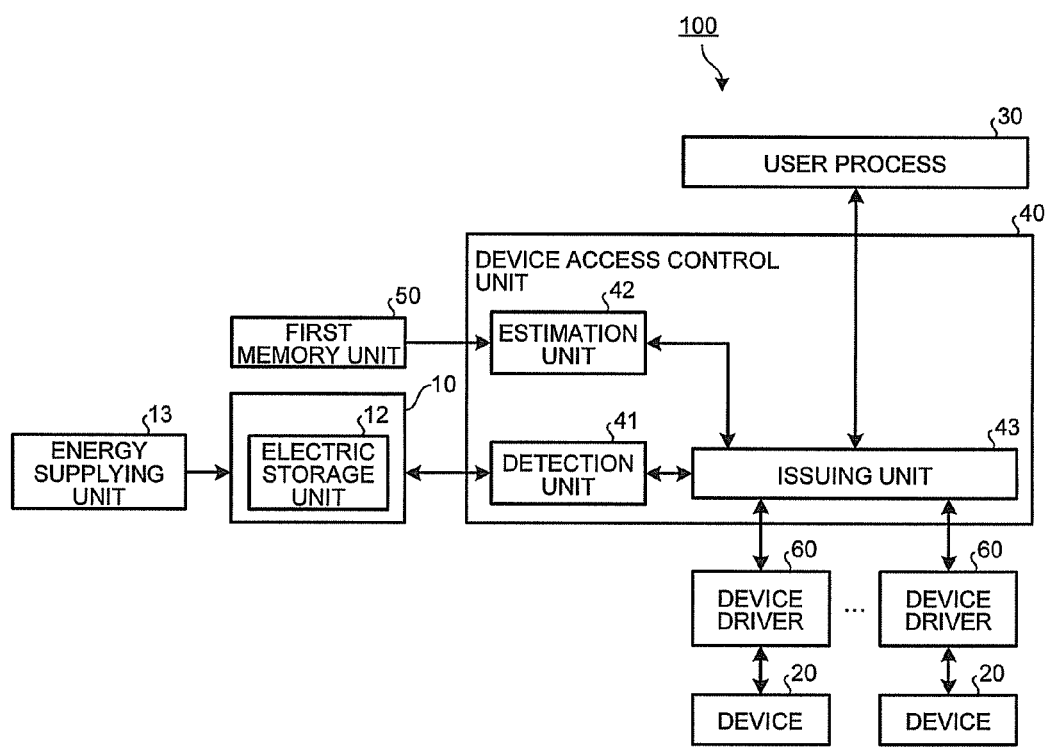
FIG. 13 is a block diagram illustrating an example of a configuration of a system according to a modified example.

Furthermore, in the first embodiment described above, the power supply unit 10 includes the energy conversion unit 11 and the electric storage unit 12; however, it is not limited to this and, for example, as illustrated in FIG. 13, the power supply unit 10 may be configured to include only the electric storage unit 12 without including the energy conversion unit 11. In the example in FIG. 13, the electric storage unit 12 can store power supplied from an energy supplying unit 13 configured to be attachable to and detachable from the electric storage unit 12. It is sufficient that the energy supplying unit 13 has a function of supplying power, and the energy supplying unit 13 may be composed of, for example, a solar cell system or an AC power source (commercial power source).

Figure 14:
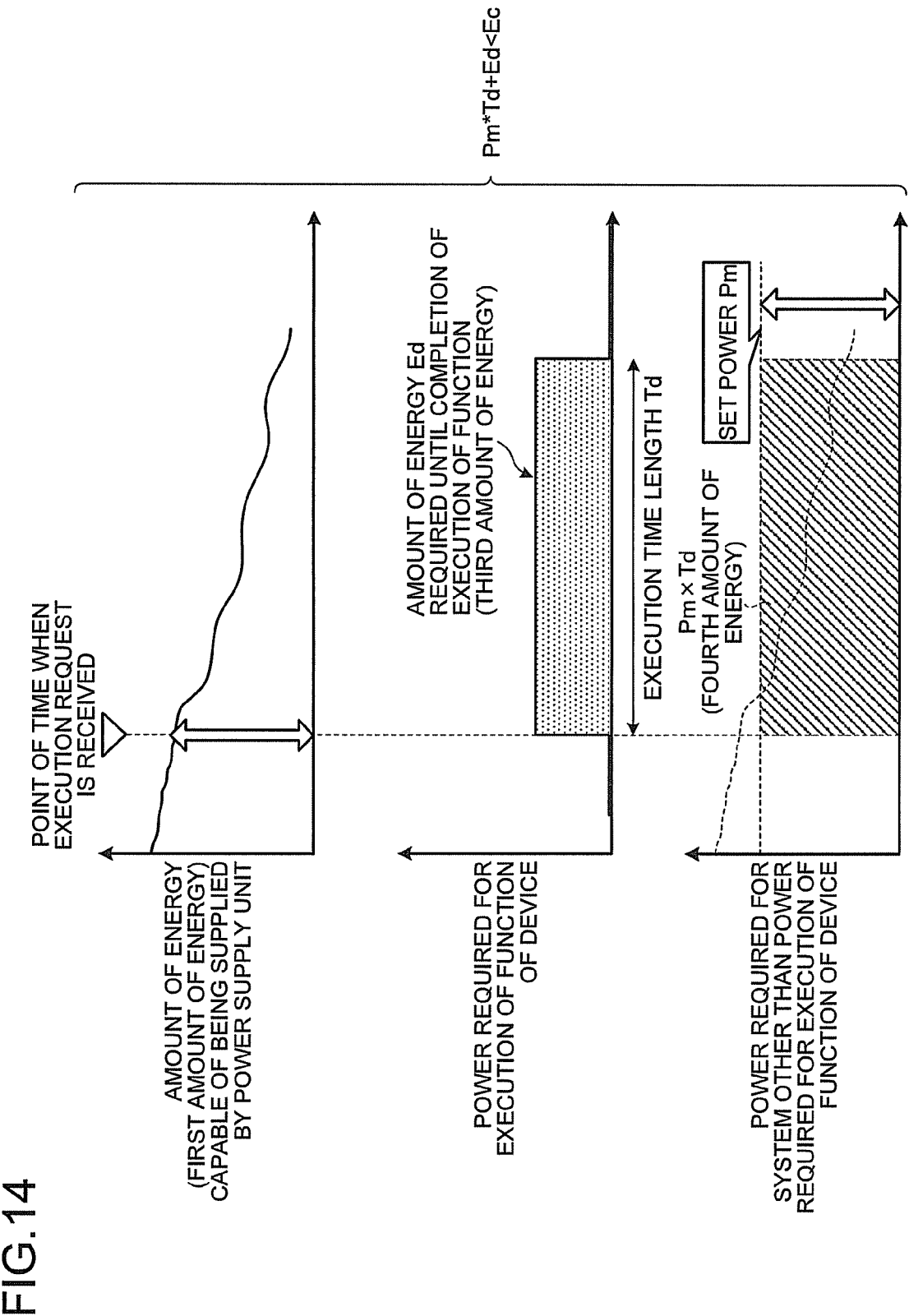
FIG. 14 is a diagram schematically illustrating a change in a first power amount over time according to a modified example.

In the example in FIG. 13, the electric storage unit 12 is charged by connecting the electric storage unit 12 to the energy supplying unit 13. Then, when charging is completed, a method of use is considered in which the electric storage unit 12 is disconnected from the energy supplying unit 13 and the system 100 is driven by discharging the power stored in the electric storage unit 12. In this case, the amount of power (first power amount) that the power supply unit 10 can supply is the amount of power (Wh) that can be drawn from the electric storage unit 12, and the amount of power can be calculated by multiplying the rated voltage (V) of the electric storage unit 12 by the electric storage capacity (Ah). In this case, the electric storage capacity of the electric storage unit 12 decreases monotonically as the electric storage unit 12 discharges the power; therefore, for example, as illustrated in FIG. 14, the amount of power (first power amount) that the power supply unit 10 (the electric storage unit 12) can supply decreases monotonically as the time of operating the device passes.

Also, a program executed in the above-described control device may be provided by being stored on a computer connected to a network such as the Internet and then downloaded through the network. Further, a program executed in the above-described control device may be provided or distributed through a network such as the Internet. Also, a program executed in the above-described control device may be provided by being embedded in a ROM or the like.

What is claimed is:

1. A control apparatus for controlling a target device, comprising:
    an estimation unit configured to estimate a second amount of energy required for the entire system including the target device and the control apparatus until the target device completes an execution of its function that is requested in accordance with an execution request for the target device; and
    an issuing unit configured to issue a control command for causing the target device to execute its function in accordance with the execution request, when a first amount of energy at a time point of receiving the execution request is greater than the second amount of energy.

2. The control apparatus according to claim 1, further comprising a first memory unit configured to store therein one or more pieces of correspondence information in which identification information for identifying a function of the target device, a third amount of energy required for the execution of the function of the target device, and an execution time length for which the target device executes the function are associated with one another,
    wherein the estimation unit reads, from the first memory unit, the third amount of energy and the execution time length that correspond to the identification information identifying a function requested by the execution request, and estimates the second amount of energy by using the execution time length and the third amount of energy that are read.

3. The control apparatus according to claim 2, wherein the estimation unit estimates, as the second amount of energy, the sum of the third amount of energy and a fourth amount of energy, the fourth amount of energy being obtained by multiplying a set power, which is set in advance as required power other than the power required for the execution of the function of the target device, by the execution time length.

4. The control apparatus according to claim 1, wherein
the estimation unit estimates, at a first time point after the start of the execution of the function of the target device, a fifth amount of energy required for the entire system from the first time point until the completion of the execution of the function of the target device, and
the issuing unit performs a control for reducing power consumption of the system, when the first amount of energy at the first time point is smaller than the fifth amount of energy.

5. The control apparatus according to claim 1, wherein
after the start of the execution of the function of a first target device, when receiving a second execution request for requesting a second target device different from a first target device to execute its function, the estimation unit estimates a sixth amount of energy that is required for the entire system from a time point of receiving the second execution request until completion of the execution of the functions of the first device and the second device, and
when the first amount of energy at the time point of receiving the second execution request is greater than the sixth amount of energy, the issuing unit issues a second control command for causing the second device to execute its function, but when the first amount of energy at the time point of receiving the second execution request is smaller than the sixth amount of energy, the issuing unit does not issue the second control command.

6. The control apparatus according to claim 1, further comprising a second memory unit configured to store therein the execution request,
wherein, when the first amount of energy is smaller than the second amount of energy, the issuing unit writes the received execution request into the second memory unit without issuing the control command for causing the target device to execute its function in accordance with the received execution request.

7. The control apparatus according to claim 6, wherein
at a second time point after the execution request is written in the first memory unit, the estimation unit estimates the second amount of energy required for the entire system until the completion of the execution of the function of the target device in accordance with the execution request stored in the second memory unit, and
when the first amount of energy at the second time point is greater than the second amount of energy estimated by the estimation unit at the second time point, the issuing unit issues the control command for causing the target device to execute its function in accordance with the execution request stored in the second memory unit, but when the first amount of energy at the second time point is smaller than the second amount of energy estimated by the estimation unit at the second time point, the issuing unit performs a control of holding the execution request without issuing the control command for causing the target device to execute its function in accordance with the execution request stored in the second memory unit.

8. The control apparatus according to claim 1, wherein the power supply unit includes an energy conversion unit configured to convert energy other than electricity into electric energy, and an electric storage unit configured to store the electric energy converted by the energy conversion unit.

9. A control method comprising:
estimating a second amount of energy required for the entire system including a target device and a control apparatus for controlling the target device until the target device completes an execution of its function that is requested in accordance with an execution request for the target device; and
issuing a control command for causing the target device to execute its function in accordance with the execution request, when a first amount of energy at a time point of receiving the execution request is greater than the second amount of energy.

10. A computer program product comprising a non-transitory computer-readable medium containing a program that causes a control apparatus, which controls an execution of a function of a device, to execute:
estimating a second amount of energy required for the system including a target device and a control apparatus for controlling the target device until the target device completes an execution of its function that is requested in accordance with an execution request for the target device; and
issuing a control command for causing the target device to execute its function in accordance with the execution request, when a first amount of energy at a time point of receiving the execution request is greater than the second amount of energy.

11. A semiconductor device for controlling a target device, comprising:
an estimation unit configured to estimate a second amount of energy required for the entire system including the target device and the control apparatus until the target device completes an execution of its function that is requested in accordance with an execution request for the target device; and
an issuing unit configured to issue a control command for causing the target device to execute its function in accordance with the execution request, when a first amount of energy at a time point of receiving the execution request is greater than the second amount of energy.

12. A control method, comprising:
estimating a second amount of energy required for an entire system including a target device and a control apparatus for controlling a target device until the target device completes an execution of its function that is requested in accordance with an execution request for the target device; and
issuing a control command for causing the target device to execute its function in accordance with the execution request, when a first amount of energy at a time point of receiving the execution request is greater than the second amount of energy, the first amount of energy being an amount of energy suppliable by a power supply unit that supplies a power to the system, wherein
the estimating includes, after a start of the execution of the function of a first target device, when receiving a second execution request for requesting a second target device different from the first target device to execute its function, estimating a sixth amount of energy that is required for the entire system from a time point of receiving the second execution request until completion of the execution of the functions of the first device and the second device, and the issuing includes, when the first amount of energy at the time point of receiving the second execution request is greater than the sixth amount of energy, issuing a second control command for causing the second device to execute its function, but when the first amount of energy at the time point of receiving the second execution request is smaller than the sixth amount of energy, not issuing the second control command.

\* \* \* \* \*